(12) United States Patent
Payne

(10) Patent No.: US 12,075,791 B2
(45) Date of Patent: Sep. 3, 2024

(54) PAPER INTERLEAVER

(71) Applicant: Richard Payne, Plymouth, WI (US)

(72) Inventor: Richard Payne, Plymouth, WI (US)

(73) Assignee: TOMAHAWK MANUFACTURING, INC., Plymouth, WI (US)

( * ) Notice: Subject to any disclaimer, the term of this patent is extended or adjusted under 35 U.S.C. 154(b) by 292 days.

(21) Appl. No.: 16/687,904

(22) Filed: Nov. 19, 2019

(65) Prior Publication Data
US 2020/0100512 A1    Apr. 2, 2020

Related U.S. Application Data

(62) Division of application No. 15/150,667, filed on May 10, 2016, now Pat. No. 10,492,502.

(51) Int. Cl.
*A22C 9/00* (2006.01)
*A22C 7/00* (2006.01)
*B65B 25/08* (2006.01)
*B65D 3/08* (2006.01)

(52) U.S. Cl.
CPC ............ *A22C 7/0084* (2013.01); *B65B 25/08* (2013.01)

(58) Field of Classification Search
CPC ......... A22C 7/00; A22C 7/0084; A22C 7/003; A22C 7/0076; A22C 9/008; B65B 25/08; B65B 25/065; B65D 3/008
USPC .............................. 426/420; 53/157; 452/141
See application file for complete search history.

(56) References Cited

U.S. PATENT DOCUMENTS

| | | | | |
|---|---|---|---|---|
| 2,667,420 A | * | 1/1954 | Meulemans | A01J 27/04 414/789.5 |
| 2,813,033 A | * | 11/1957 | Schneider | B65B 25/06 53/436 |
| 3,153,808 A | * | 10/1964 | Weien | A22C 7/0076 425/572 |
| 3,203,037 A | * | 8/1965 | Anhanger | A22C 7/00 425/556 |
| 3,347,176 A | * | 10/1967 | Hall | B65B 25/08 264/297.7 |
| 3,475,184 A | * | 10/1969 | Greenly | B65B 25/08 53/440 |
| 3,786,536 A | * | 1/1974 | Deckert | A22C 9/00 452/141 |
| 3,900,919 A | * | 8/1975 | Lekan | A22C 7/0076 452/142 |
| 3,952,478 A | * | 4/1976 | Richards | B65B 25/08 53/122 |
| 3,962,751 A | * | 6/1976 | Wagner | A22C 9/004 452/142 |
| 3,991,168 A | * | 11/1976 | Richards | B65B 25/08 53/157 |
| 4,031,789 A | * | 6/1977 | Soodalter | B26D 3/22 83/835 |
| 4,137,604 A | * | 2/1979 | Sandberg | B65B 35/50 53/157 |
| 4,516,291 A | * | 5/1985 | Goldberger | A22C 7/00 426/513 |
| 4,768,260 A | * | 9/1988 | Sandberg | A22C 7/0076 425/574 |

(Continued)

*Primary Examiner* — Gloria R Weeks
(74) *Attorney, Agent, or Firm* — Philip M. Weiss; Weiss & Weiss

(57) ABSTRACT

A paper interleaver that is separate from the food patty molding machine for inserting a sheet of paper underneath a meat patty.

9 Claims, 16 Drawing Sheets

(56) References Cited

U.S. PATENT DOCUMENTS

| | | | | |
|---|---|---|---|---|
| 5,051,268 | A * | 9/1991 | Mally | B65B 25/08 426/414 |
| 5,182,120 | A * | 1/1993 | Kusters | A22C 7/00 425/238 |
| 5,695,183 | A * | 12/1997 | Stoub | B65H 1/06 271/166 |
| 5,724,874 | A * | 3/1998 | Lindee | B26D 7/22 83/403.1 |
| 6,368,092 | B1 * | 4/2002 | Lindee | A22C 7/00 425/107 |
| 6,428,303 | B2 * | 8/2002 | Lindee | A22C 7/0084 426/513 |
| 7,255,554 | B2 * | 8/2007 | Lamartino | A22C 7/0023 425/547 |
| 7,591,644 | B2 * | 9/2009 | Sandberg | A23P 30/10 425/572 |
| 8,840,390 | B2 * | 9/2014 | Miller | A22C 7/0076 425/145 |
| 9,022,774 | B2 * | 5/2015 | Mauer | A23P 30/10 425/408 |
| 9,028,239 | B2 * | 5/2015 | Van Gerwen | A22C 7/0092 425/289 |
| 9,044,029 | B2 * | 6/2015 | Van Der Eerden | A22C 7/0092 |
| 9,399,531 | B2 * | 7/2016 | Pryor | B26D 7/27 |
| 9,439,443 | B2 * | 9/2016 | Van Gerwen | B65B 25/08 |
| 9,533,784 | B2 * | 1/2017 | Van Gerwen | B65B 37/08 |
| 9,861,108 | B2 * | 1/2018 | Van Gerwen | A22C 7/0069 |
| 9,878,462 | B2 * | 1/2018 | Horberg | B26D 7/325 |
| 9,949,493 | B2 * | 4/2018 | Van Gerwen | A23P 30/10 |
| 2005/0092187 | A1 * | 5/2005 | Lamartino | A22C 7/003 99/353 |
| 2008/0078896 | A1 * | 4/2008 | Browne | F16B 1/0014 248/205.8 |
| 2009/0087530 | A1 * | 4/2009 | Miller | A22C 7/0076 426/420 |
| 2012/0073249 | A1 * | 3/2012 | Pryor | B65B 41/12 53/514 |
| 2013/0280393 | A1 * | 10/2013 | Van Gerwen | A22C 7/0069 426/389 |
| 2014/0308420 | A1 * | 10/2014 | Conerton | A22C 7/0084 425/422 |
| 2015/0053057 | A1 * | 2/2015 | Dreier | B65B 25/08 83/42 |
| 2016/0346951 | A1 * | 12/2016 | Horberg | B33Y 80/00 |

* cited by examiner

PAPER INTERLEAVER

CROSS REFERENCE TO RELATED APPLICATIONS

This application is a divisional of application Ser. No. 15/150,667 filed May 10, 2016.

FIELD OF THE INVENTION

The present invention relates to a paper interleaver that is separate from the food patty molding machine for inserting a sheet of paper underneath a meat patty.

BACKGROUND OF THE INVENTION

U.S. Pat. No. 7,159,372 relates to a sheet interleave system for reciprocating mold plate patty forming apparatus used during the processing and packaging of patty molded food products. The apparatus inserts thin, flexible material, such as sheets of paper, plastic film, or other like material, between adjacent, individual finished patty molded products immediately upon the molded patties being knocked out of the cavities in the mold plate of the patty forming apparatus.

SUMMARY OF THE INVENTION

The present invention relates to a paper interleaver that is separate from the food patty molding machine for inserting a sheet of paper, or other like material, underneath a food patty.

The present invention relates to a system for making food patties with a sheet of paper underneath the patty comprising: a food patty molding machine; a separate cuber machine, and a separate interleaver which inserts a sheet of paper underneath a food patty.

The present invention relates to a system for making food patties with a sheet of paper underneath the patty comprising: a food patty molding machine, and a separate interleaver which inserts a sheet of paper underneath a food patty.

In the paper interleaver, paper is loaded into a hopper (box). The bottom of the box is open. A device beneath the hopper releases paper one sheet at a time. It is an object of the present invention for a paper pusher to hold the paper down in the hopper. It is an object of the present invention to use a tear pin design to release one sheet of paper at a time. A shuttle plate reciprocates under the hopper. The shuttle plate contains one or more holes (ports) which draw air into the ports creating a suction or vacuum to hold the paper in place. The paper is then transported to a location. The location can be determined by a mechanical stop, positions by a hydraulic cylinder, a pneumatic cylinder, an electric motor with limit switch or proximity sensor, or a servo motor.

It is an object of the present invention to have multiple hoppers attached to a baseplate, each hopper having an opening at the bottom where the paper comes out of the hopper. It is an object of the present invention for there to be a guide plate under the hopper that is a guide for the fingers and holds the hopper in place.

It is an object of the present invention for each of the hoppers to have fingers that are either in an extended or retracted position, having vacuum corning through openings in the fingers to hold the paper once it is released from the hopper. It is an object of the present invention for the fingers to be part of a finger mounting bracket. It is an object of the present invention for the finger mounting bracket and the fingers to move out and back from below the hopper.

It is an object of the present invention for the finger mounting bracket to comprise lightning holes that lessen the weight of the finger mounting bracket so that the servo drive motor moves the finger mounting bracket faster due to less weight.

It is an object of the present invention for all of the fingers to move together at the same time.

It is an object of the present invention for the shuttle to be in a forward position or a retracted position, the shuttle attached to the finger mounting bar having fingers mounted on it, the shuttle bracket connected to guide shafts.

It is an object of the present invention for the fingers to not be connected to a finger mounting bracket so that the fingers move separately.

A patty is delivered via a conveyor to the paper interleaver. The patty is detected by a switch or sensor. The switch or sensor sends a signal to stop the vacuum which is holding the paper to the shuttle. The patty reaches the end of the conveyor and falls on the shuttle with the paper in place. As the shuttle withdraws, the patty with the paper fall onto an exit device (conveyor or packaging machine). The shuttle then retracts and moves forward picking up the next piece of paper as described above.

It is an object of the present invention for the bottom of the hopper to contain a sharp blade that allows only one sheet of paper to be released at a time from the hopper of the interleaver.

It is an object of the present invention for the food patty molding machine to comprise a maid plate that delivers the food patties to an inbound conveyor of the cuber machine and then to the cuber machine, then followed by an outbound conveyor of the cuber machine which moves the food patties to an inbound conveyor of the interleaver which then moves the patties to the interleaver. It is an object of the present invention for the system to comprise an outbound interleaver conveyor at the end of the paper interleaver.

It is an object of the present invention for the food patty molding machine to comprise a mold plate that delivers the food patties to an inbound conveyor of the interleaver which then moves the patties to the interleaver, then to an outbound interleaver conveyor at the end of the paper interleaver.

It is an object of the present invention for the inbound interleaver conveyor to be comprised of a conveyor belt and a laser head assembly. It is an object of the present invention for the laser head assembly to determine when the paper interleaver release paper by sending signals to a computer/PLC. It is an object of the present invention for the laser head assembly to send a laser beam from one side of the inbound interleaver conveyor to the other side. It is an object of the present invention for the laser beam to be a continuous beam, that when broken, signals the computer/PLC that a patty has passed through the laser beam.

It is an object of the present invention for the system to further comprise a servo drive cabinet having controls for the inbound and outbound conveyors and belts of the interleavers that control speed, feeds and dwells of the fingers of the paper interleaver.

It is an object of the present invention for the cuber machine to comprise a cuber, having a cuber head assembly, a conveyor belt for moving the patties, an upper knife to score the top half of the patty and a lower knife to score the bottom half of the patty. It is an object of the present invention for the cuber to further comprise stripper belts.

The present invention relates to a method for placing a sheet of paper under a meat patty comprising: forming a patty by a patty forming machine. The patty is dropped (via knock out cups pushing the patty out of the mold plate) on to a conveyor moving the patty away from the machine. The patty is conveyed to move between a series of blades (top and bottom) for cubing or perforation. After perforation, the patties are conveyed to the interleaver infeed belt. The velocity of this belt is the same as or greater than the cuber belt. On the interleaver infeed belt, the patties activate a switch which starts the paper assembly process. The paper assembly process includes the use of vacuum to hold the paper to bars having ports with a vacuum force in the ports with an elastomer seal to maintain a seal between the paper and the bars. The paper is moved from the bottom of a magazine by a shuttle to position the paper for assembly to the patty. With the paper in position, the patty is conveyed to the paper and the vacuum is withdrawn, the bars move, and the patty drops to an exit conveyor. The patty is then conveyed to the next operation, i.e., freezing, packing, etc.

It is an object of the present invention for the device to apply paper to the food patty after top and bottom perforations are completed. This is not possible if the interleaver is mounted directly to the food patty molding machine. It is an object of the present invention for the device to roll out a homestyle patty and then center it on the paper. This is not possible if the interleaver is mounted directly to the food patty molding machine.

The top and bottom perforations provide quicker freezing and cooking times. Interleavers mounted to formers can only perforate the top of the food patty.

It is an object of the present invention for the device to have higher production speeds that enables the device to apply paper to double row forming technology. Interleavers mounted to formers can only apply paper to single row mold plates.

It is an object of the present invention for the paper interleaver to be used with a forming machine that comprises a rotary former.

The design of the present invention improves efficiency during production, less production interruptions/down time repairing machines mounted to the interleaver.

It is an object of the present invention for the device to eliminate many wearing of parts, therefore extending the life time of current parts, reducing the cost versus the machine mounted interleaver.

DETAILED DESCRIPTION OF THE INVENTION

Figure 1:
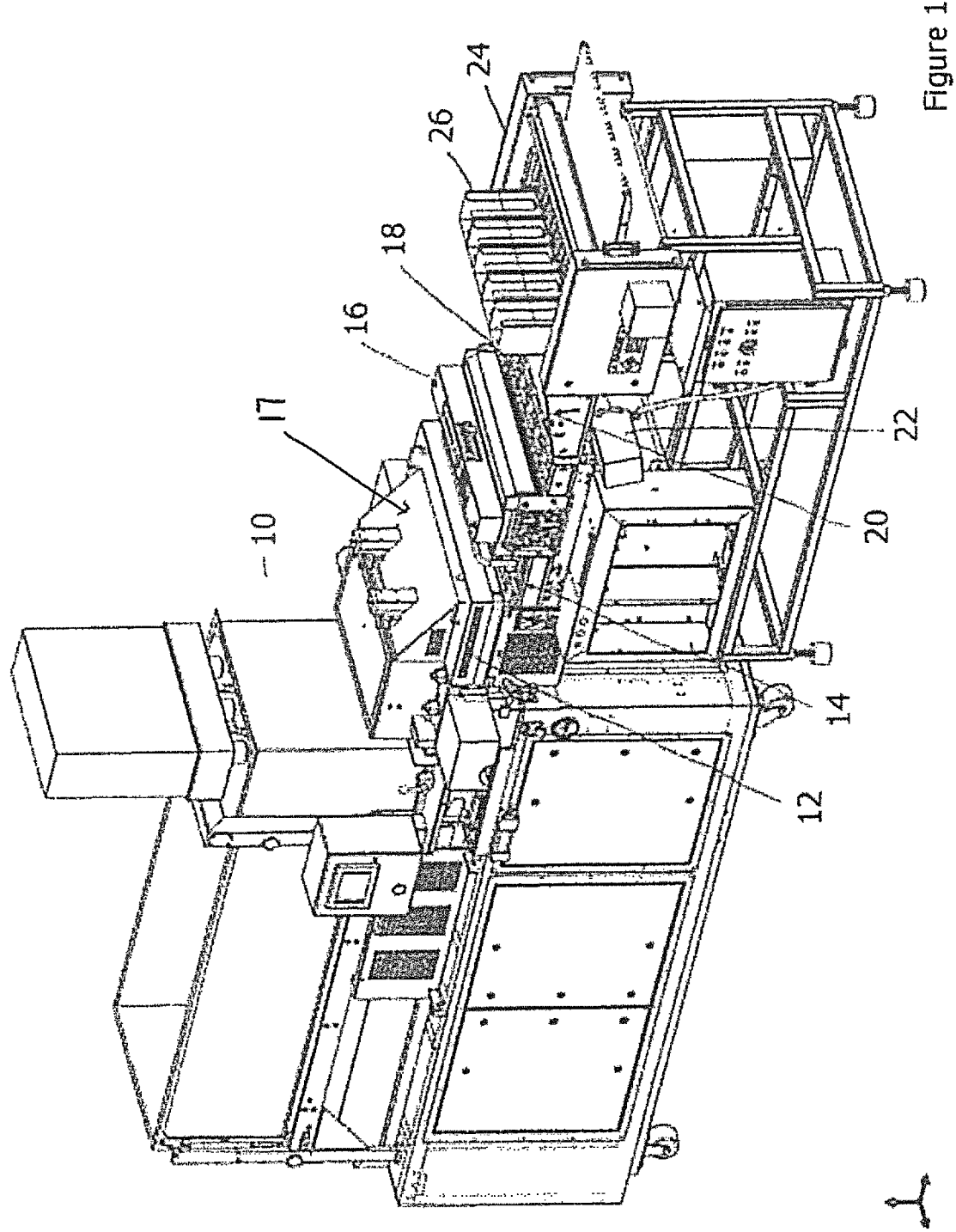
FIG. 1 shows a side view of an embodiment of a meat patty molding machine, cuber and paper interleaver of the present invention.

FIG. 1 shows a food patty molding machine 10 having a mold plate 12 that delivers patties to an inbound conveyor of the cuber 14 to the cuber 16. After the patties are cubed, they are provided to an outbound cuber conveyor 18, and then to an interleaver inbound conveyor 20, having an interleaver inbound conveyor motor 22. After the interleaver inbound conveyer is the paper interleaver 24 which has a paper hopper 26.

Figure 2:
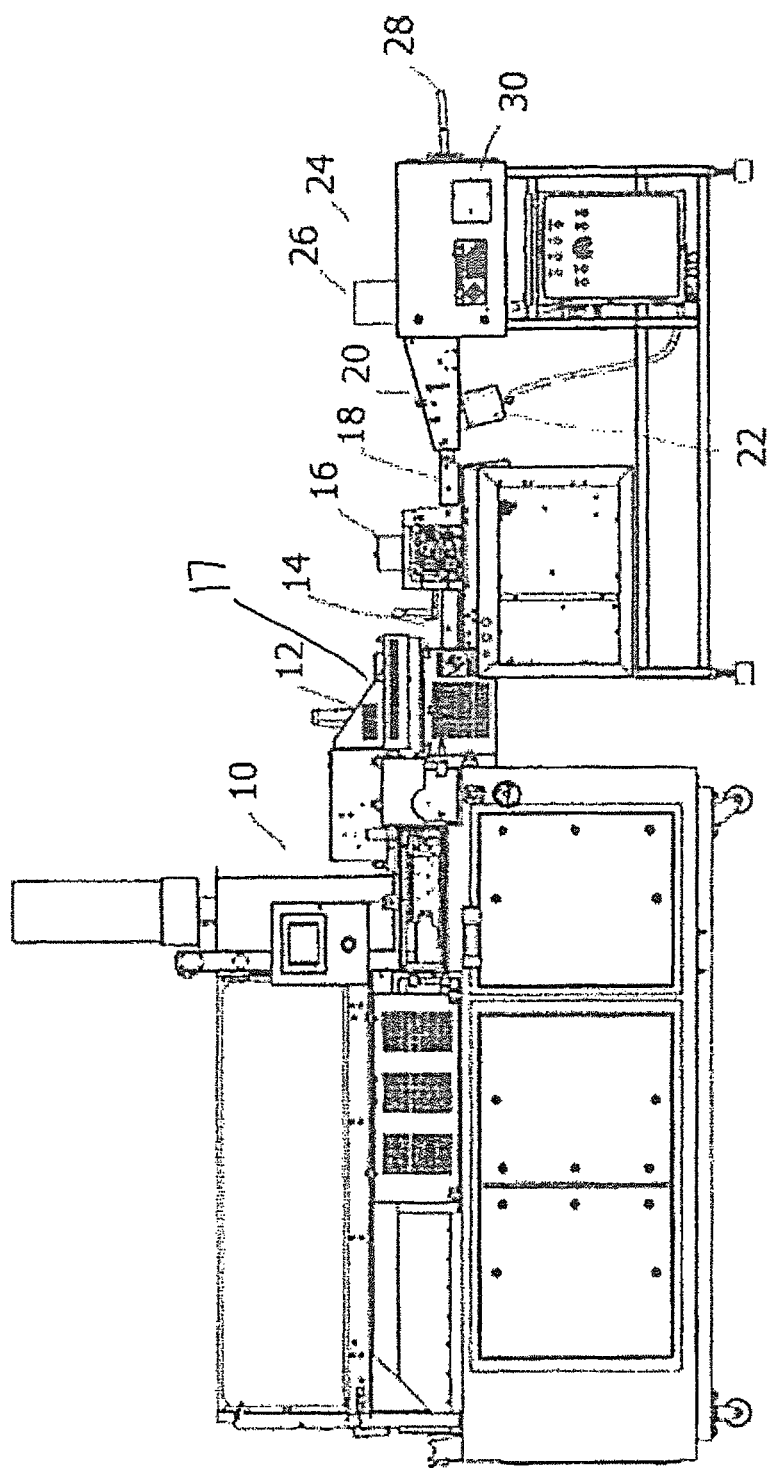
FIG. 2 shows a side view of an embodiment of a meat patty molding machine, cuber, and paper interleaver of the present invention.

FIG. 2 shows the food patty molding machine 10 having a mold plate 12 that delivers patties to an inbound conveyor of the cuber 14 to the cuber 16. After the patties are cubed, they a provided to an outbound cuber conveyor 18 and then to an interleaver inbound conveyor 20, having an interleaver inbound conveyor motor 22. After the interleaver inbound conveyor is the paper interleaver 24 which has a paper hopper 26. At the end of the paper interleaver is the outbound interleaver conveyor 28. To the side of the paper interleaver 24 is guard 30.

Figure 3:
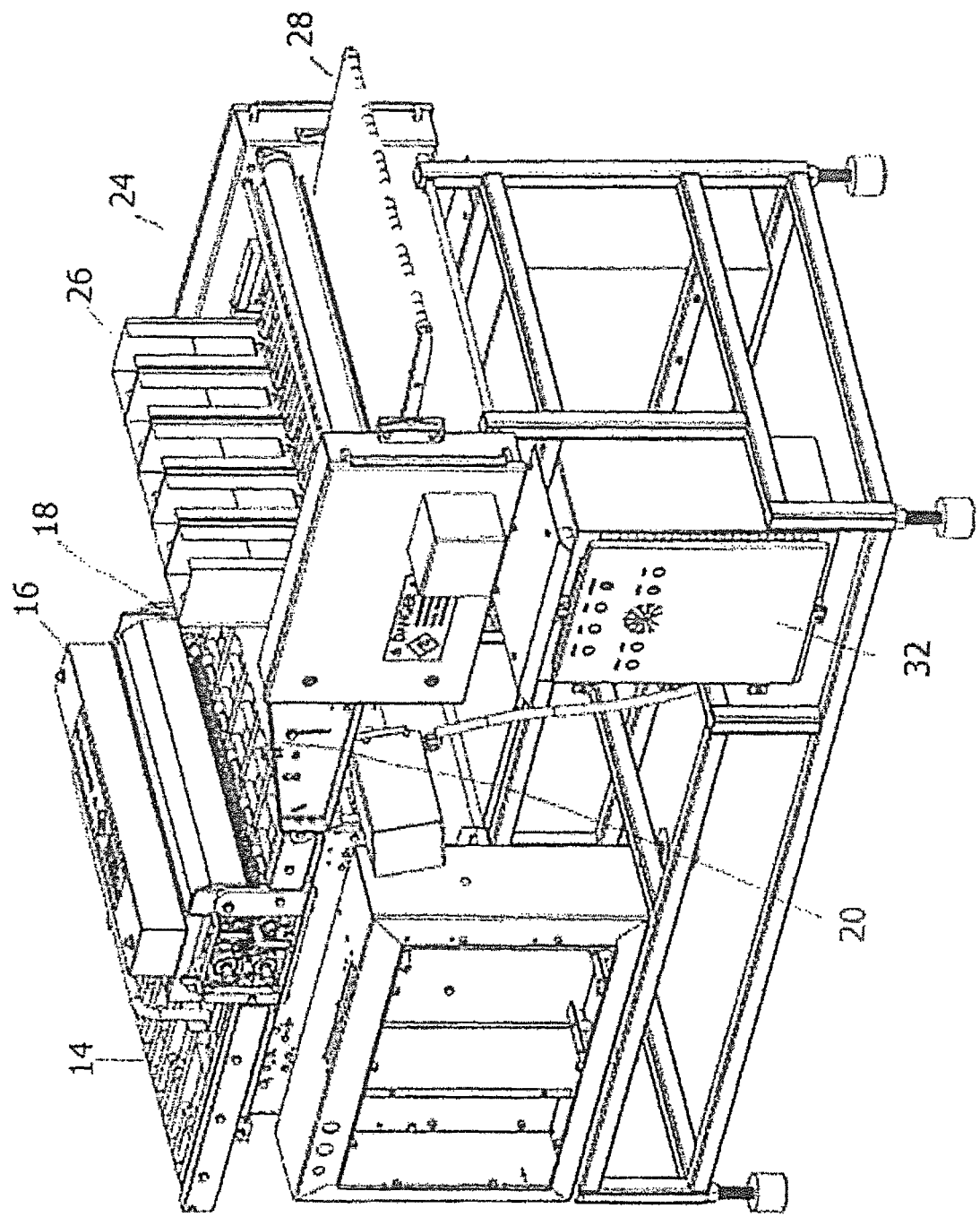
FIG. 3 shows a side view of an embodiment of a cuber and paper interleaver of the present invention.

FIG. 3 shows the inbound conveyor of the cuber 14, the cuber 16, the outbound cuber conveyor 18 and the interleaver inbound conveyor 20. The figure further shows the paper interleaver 24 having a paper hopper 26 and the outbound interleaver conveyor 28. FIG. 3 further shows the servo drive cabinet 32 that has controls for the inbound and outbound conveyor and belts of the interleaver and also controls the speeds, feeds and dwells of the fingers of the paper interleaver 24.

Figure 4:
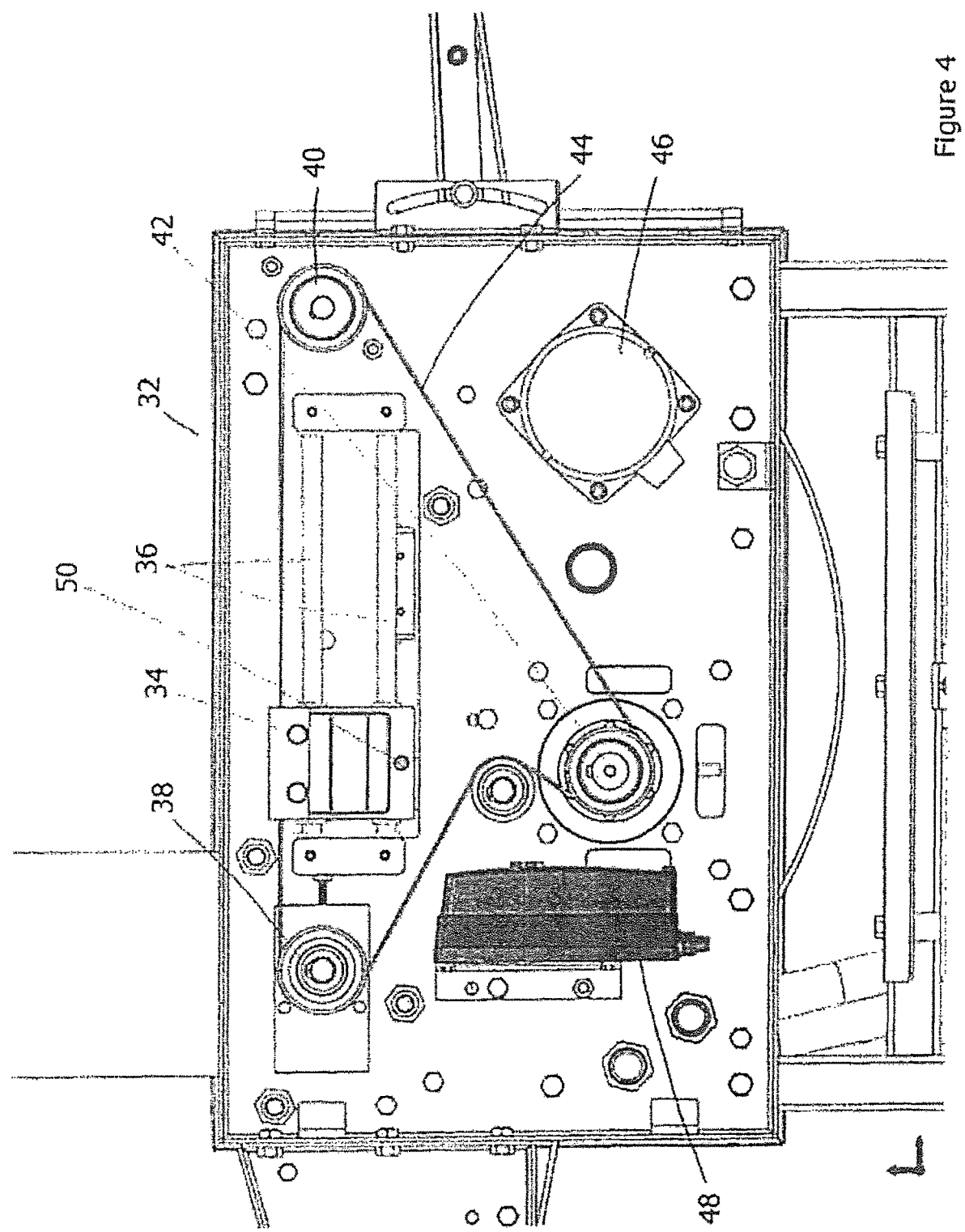
FIG. 4 shows an internal view of an embodiment of a servodrive cabinet of the present invention.

FIG. 4 shows the servo drive cabinet 32 having shuttle bracket 34 in the forward position. The shuttle bracket 34 is attached to the bar with fingers mounted on it. The shuttle bracket 34 is connected to guide shafts 36. Also in the servo drive cabinet 32 is an idler pulley 38, a drive sprocket 40, a servomotor 42, and a timing belt 44. The servo drive cabinet further comprises a motor 46 for the outbound paper interleaver conveyor. Also shown is the vacuum control valve 48 and 50 where the vacuum comes in from the vacuum control valve 48.

Figure 5:
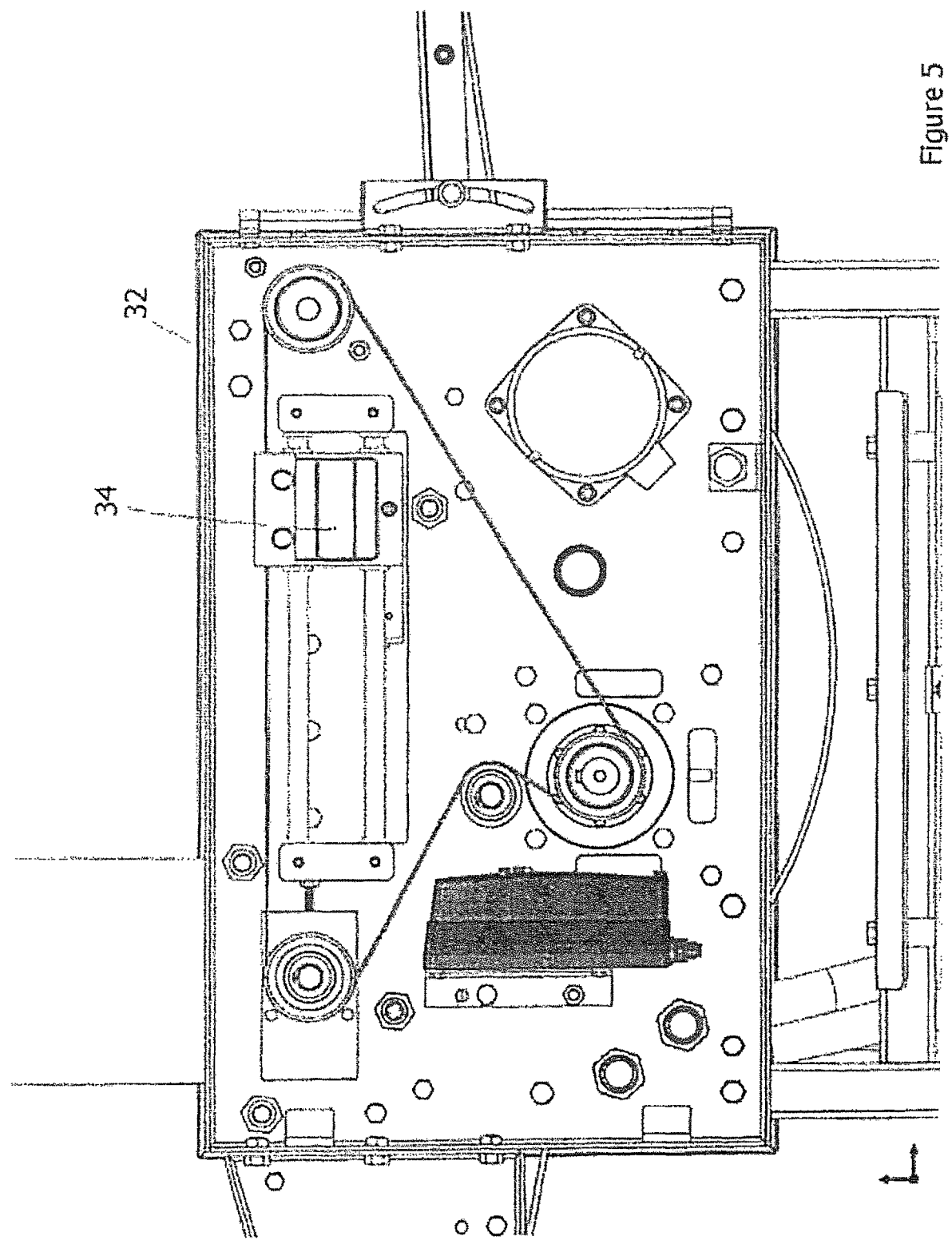
FIG. 5 shows an internal view of an embodiment of a servodrive cabinet of the present invention.

FIG. 5 shows the servo drive cabinet 32 of FIG. 4, except the only difference is the shuttle bracket 34 is in the retracted position.

Figure 6:
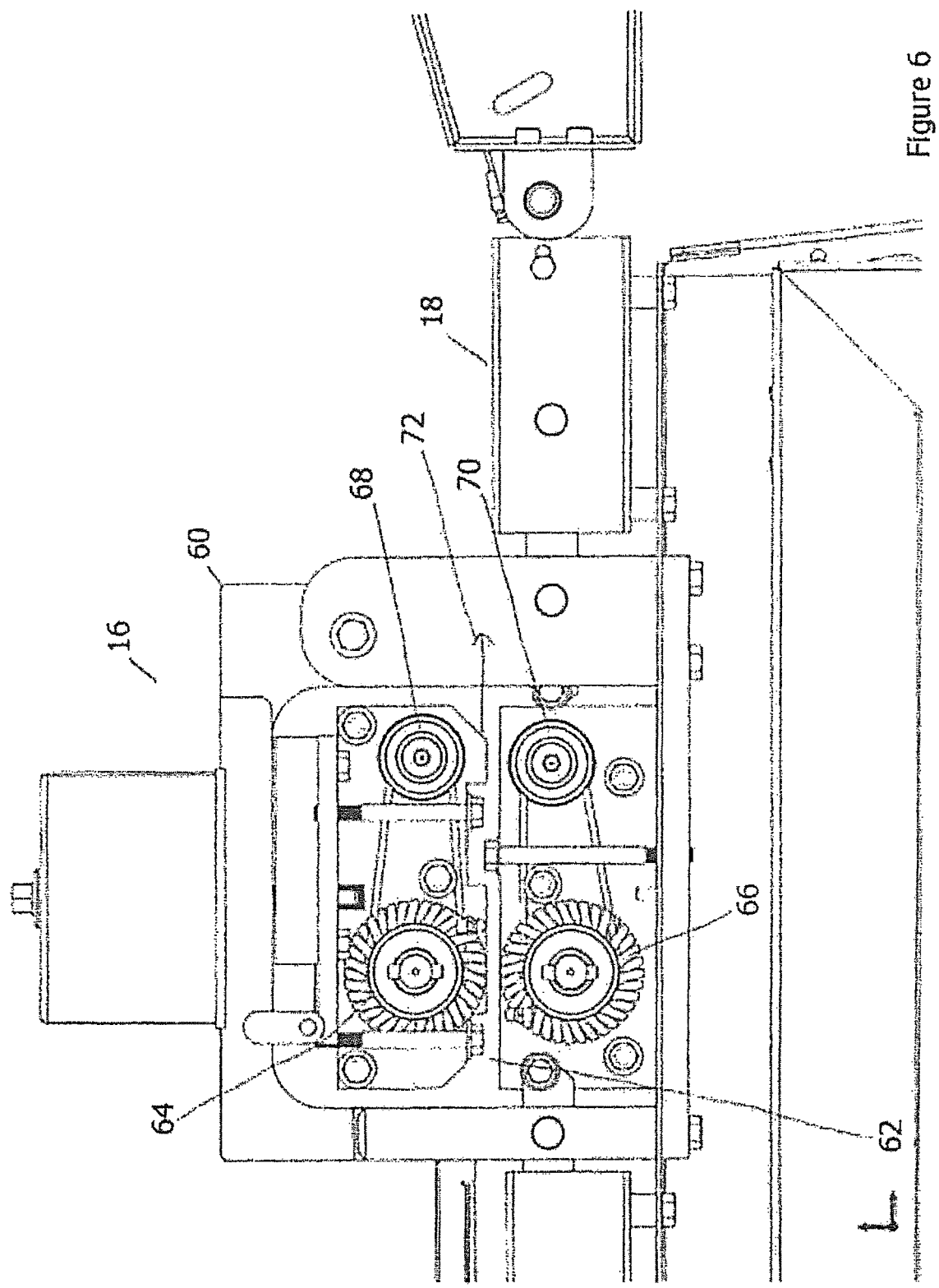
FIG. 6 shows a side view of an embodiment of the cuber of the present invention.

FIG. 6 shows an internal view of the cuber 16, having a cubing head assembly 60, and a conveyor belt 62 for moving the patties. The cuber 16 has an upper knife 64 which is used for scoring the top half of the patty and a lower knife 66 which is used for scoring the bottom haft of the patty. The cubing head assembly 60 further comprises stripper belts 68 and 70. The patties move in the direction of arrow 72. After the patties are cubed they follow outbound cuber conveyor 18.

Figure 7:
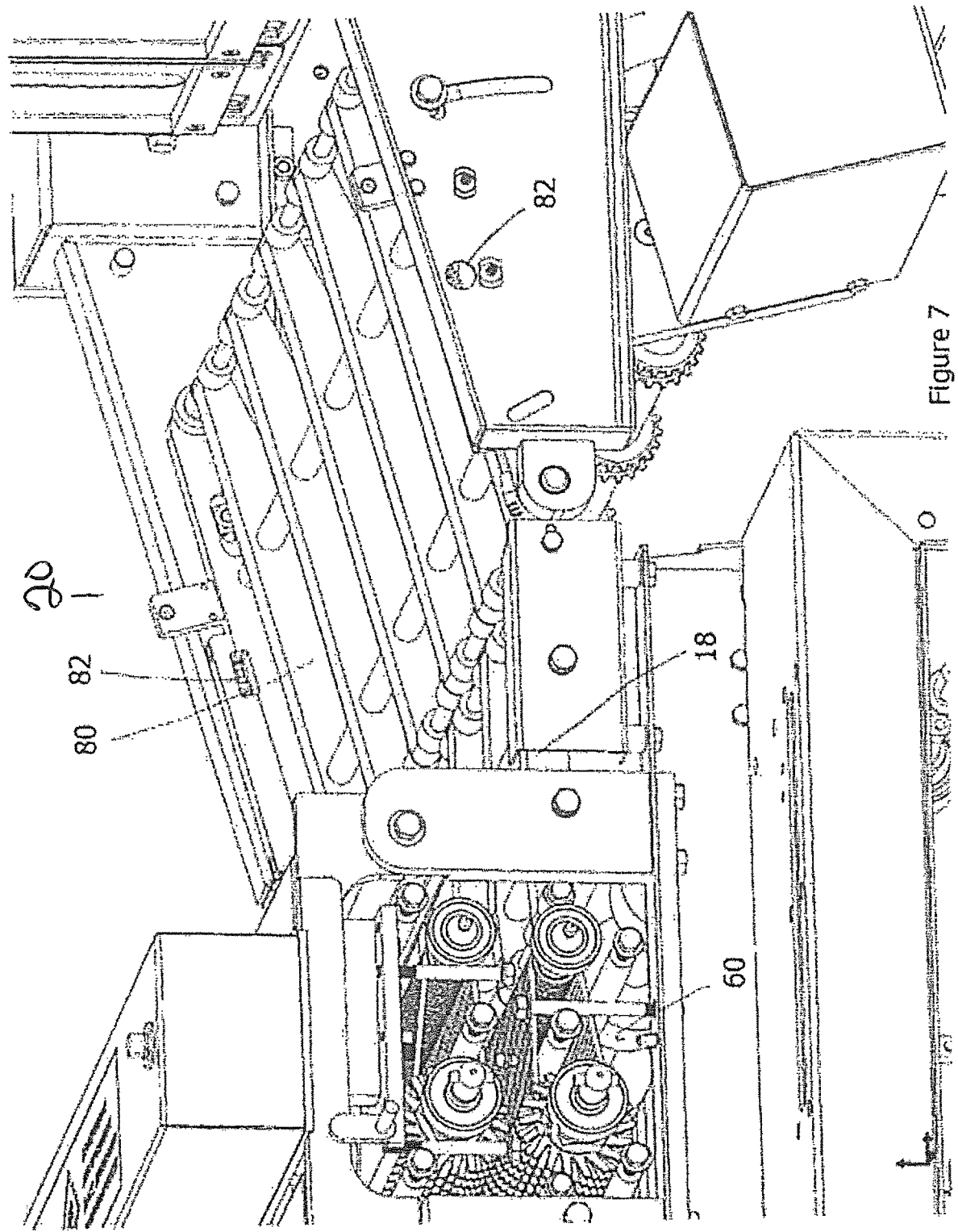
FIG. 7 shows a side view of an embodiment of the cuber and inbound paper interleaver conveyor belt of the present invention.

FIG. 7 shows the cuber head assembly 60 followed by the outbound cuber conveyor 18 which is then followed by the inbound interleaver conveyor 20. The inbound interleaver conveyor 20 is comprised of conveyor belt 80 and a laser head assembly 82. The laser head assembly 82 determines when the paper interleaver releases the paper by sending signals to a computer/PLC. The laser head assembly 82 sends a laser beam from one side of the inbound interleaver conveyor 20 to the other side. It is a continuous beam, that when broken, signals the computer that a patty has passed through the laser beam.

Figure 8:
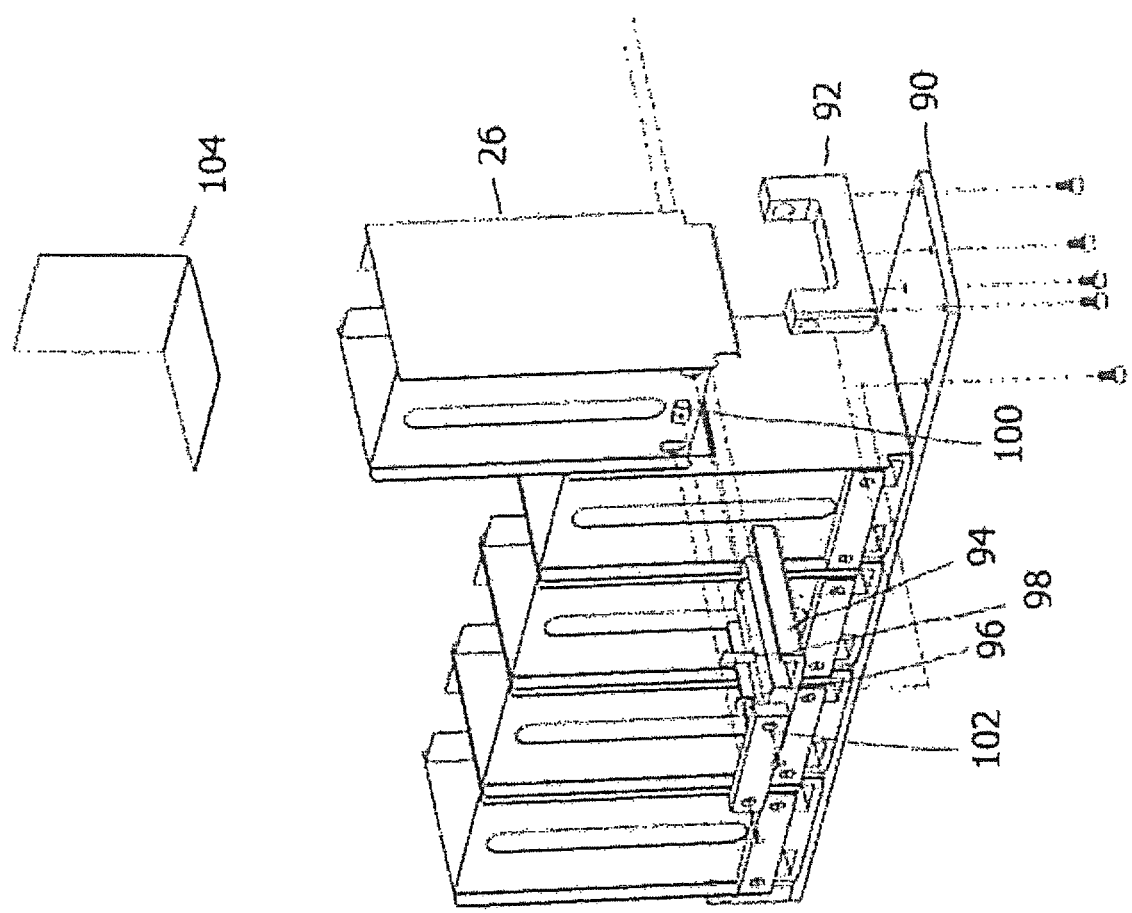
FIG. 8 shows a front view of an embodiment of the paper interleaver of the present invention.

FIG. 8 shows the paper interleaver 24 comprised of paper hoppers 26. The hopper 26 is attached to the baseplate 90 by a mounting bracket 92. Underneath the hopper is a guide plate 94 that is a guide for the fingers and holds the hopper 26 in place. In an embodiment, in front of the hopper is a spring clamp 96 that holds a spring 98 to a block 100. A bumper 102 is placed in front of the hopper 26 that protects components of the hopper. Also shown is a paper pusher 104 that holds the paper down in the hopper 26.

Figure 9:
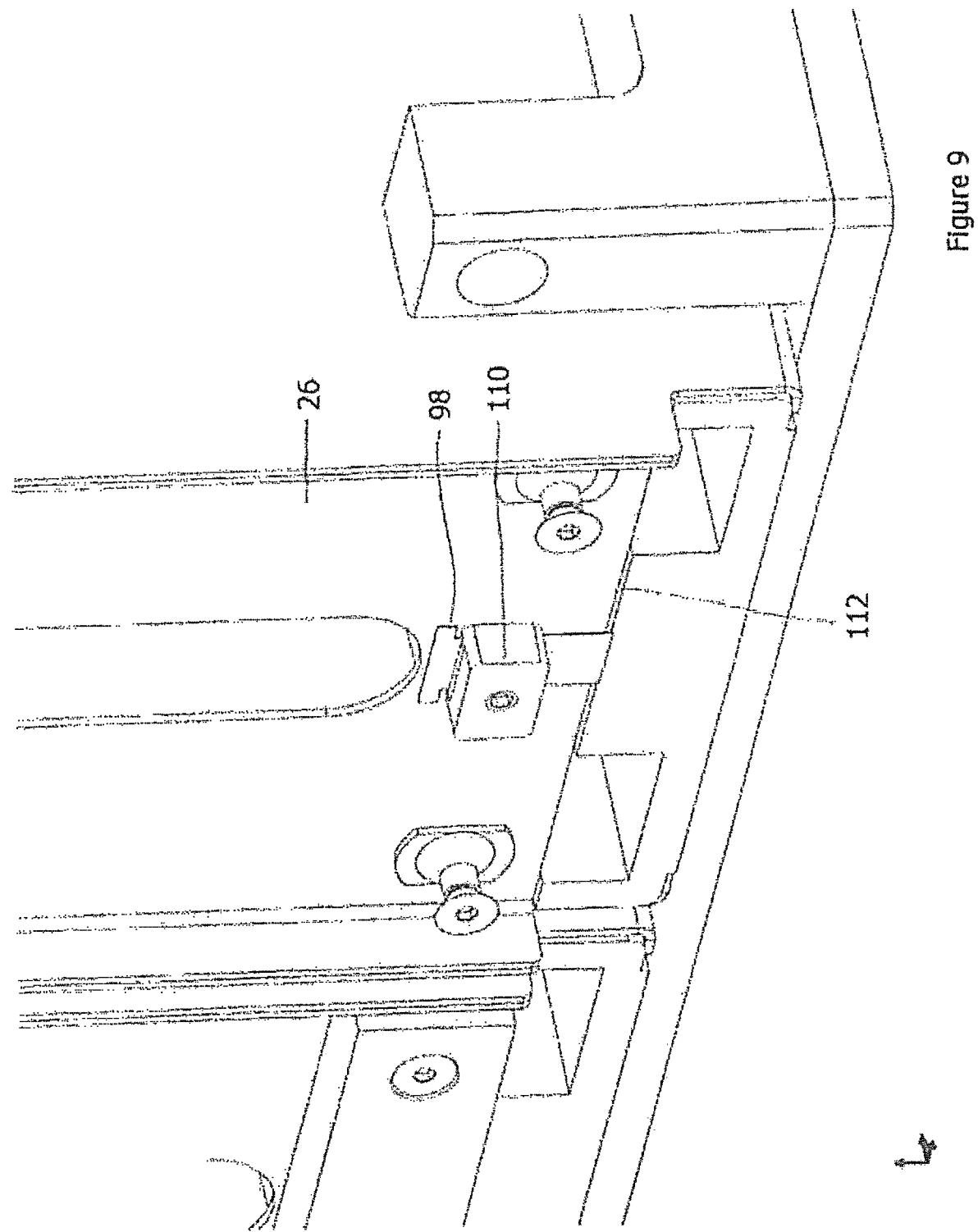
FIG. 9 shows front view of an embodiment of the paper interleaver of the present invention.

FIG. 9 shows an embodiment where the hopper 26 has a block 110 that holds a spring 98 to the hopper 26. The figure further shows slot 112 which is the opening where the paper comes out of the hopper.

Figure 10:
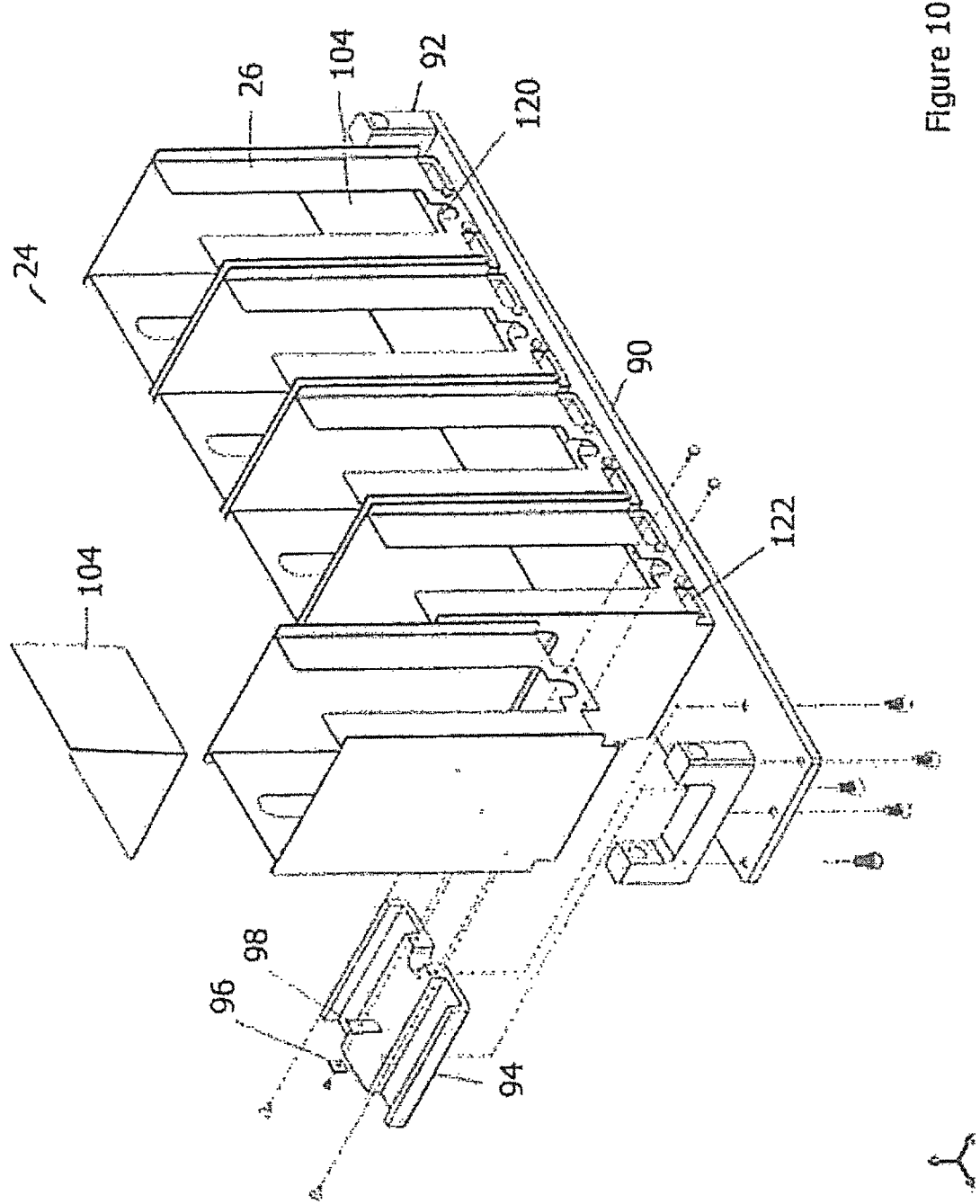
FIG. 10 shows a top view of an embodiment of the paper interleaver of the present invention.

FIG. 10 shows the hoppers 26 on top of the base plate 90. A mounting bracket 92 is on each end of the hoppers 26. A paper pusher 104 is placed on top of the paper 120. The paper pusher 104 adds weight to the paper 120. Also shown at the rear of the paper interleaver 24 are finger openings 122. Also shown in an embodiment is the guide plate 94, a spring 98 that releases the paper, and a spring clamp 96 that keeps pressure on the spring to keep it tight.

Figure 11:
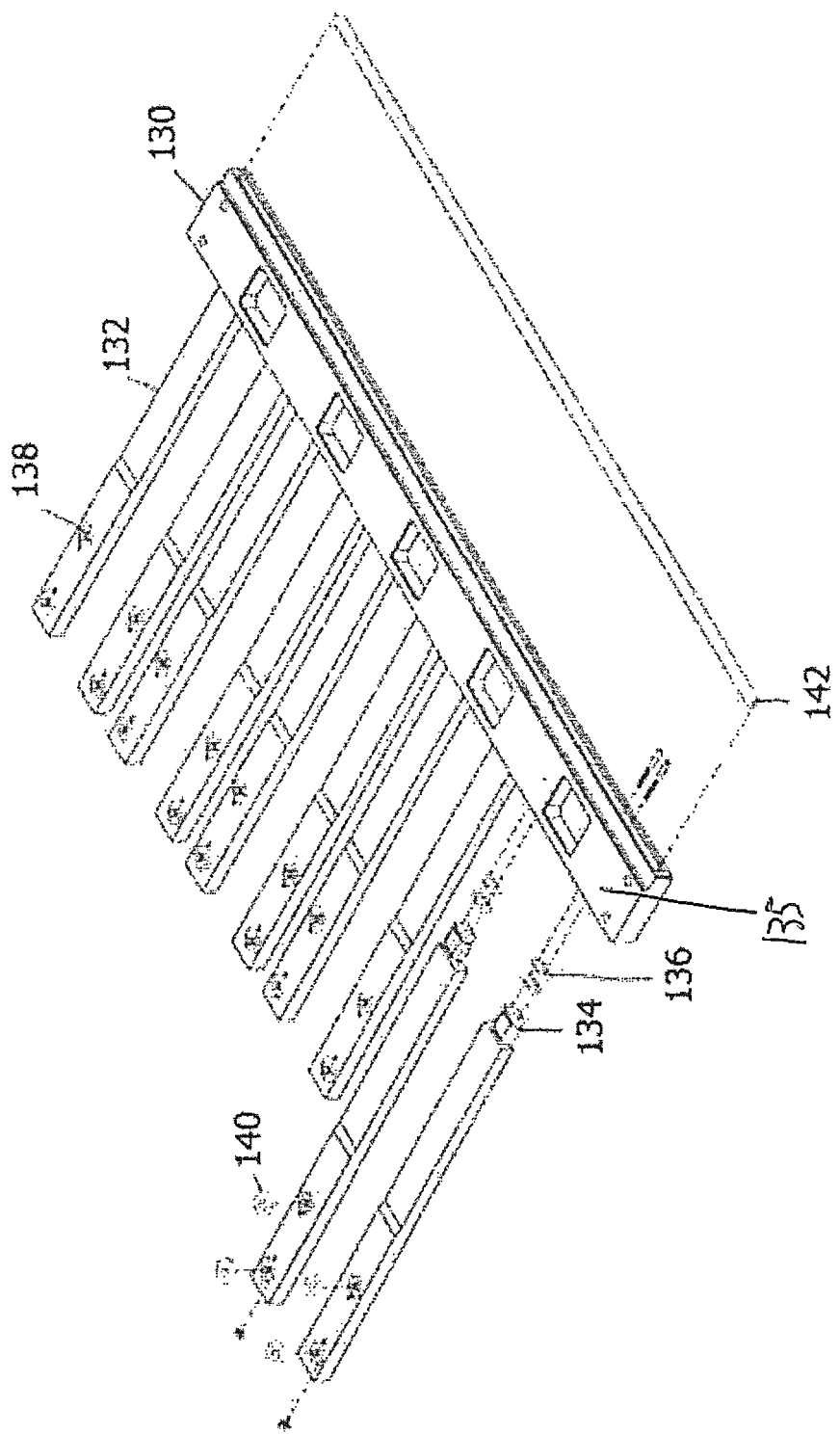
FIG. 11 shows a top view of an embodiment of finger assembly of the paper interleaver of the present invention.

FIG. 11 shows a finger mounting bracket 130 having fingers 132. The fingers 132 are mounted to the finger mounting bracket 130 by tongues 134 that are inserted through O-rings 136 and into the finger mounting bracket 130. The fingers 132 have openings 138 in which O-rings 140 are placed. Vacuum is created in the openings 138. An O-ring gasket 142 seals vacuum drawn from openings in fingers 132. Vacuum is created by the vacuum pump that sends vacuum to shuttle bracket block 34 which is where the finger mounting bracket 130 is mounted. From the finger mounting bracket 130, the vacuum goes to the fingers 132.

Figure 12:
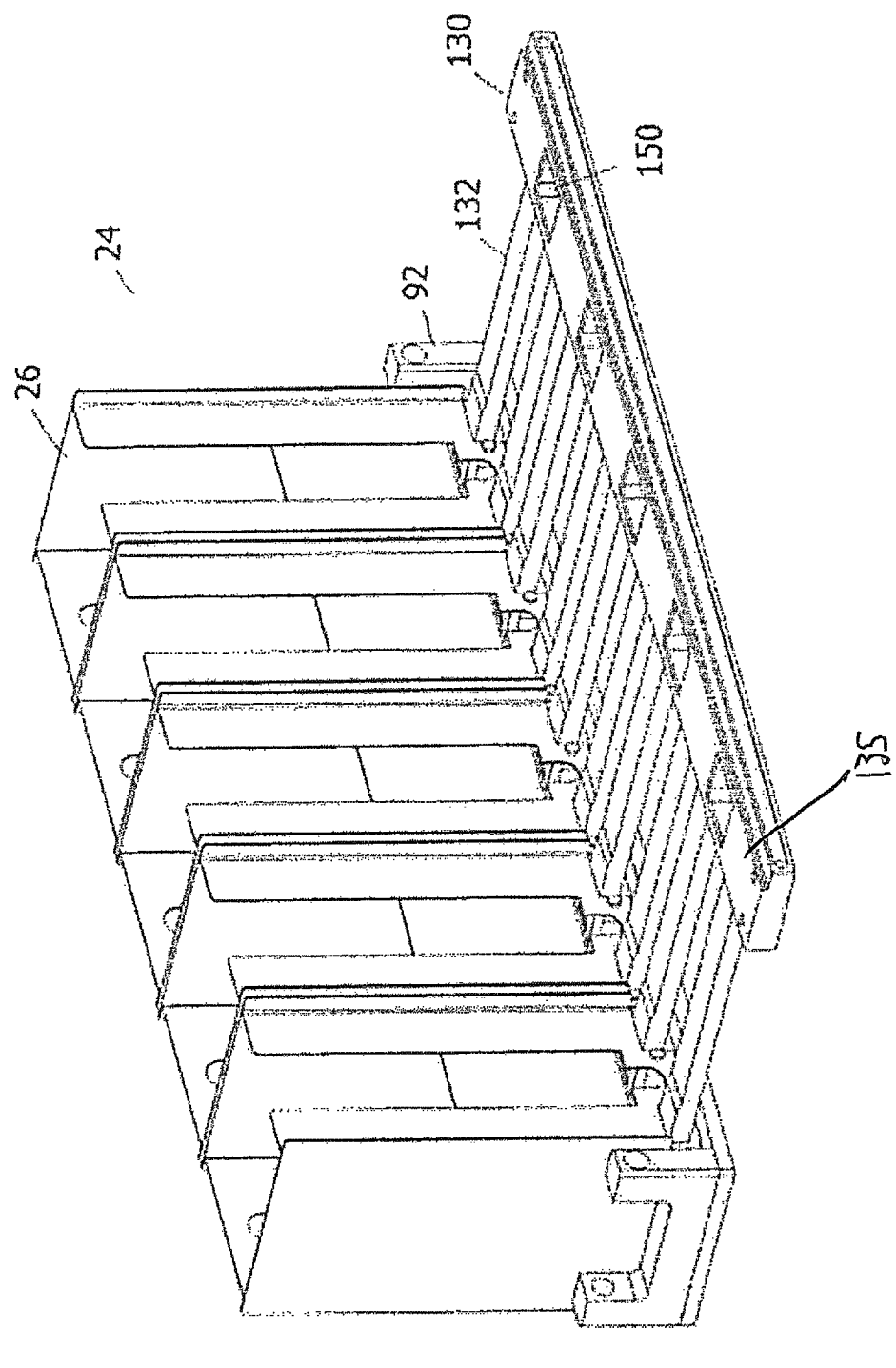
FIG. 12 shows a top view of an embodiment of the paper interleaver of the present invention.

FIG. 12 shows the paper interleaver 24 having hoppers 26 mounted between mounting brackets 92 at each end of the hoppers 26. The figure shows the finger mounting bracket 130 having lightning holes 150. The fingers 132 are shown in the retracted position.

Figure 13:
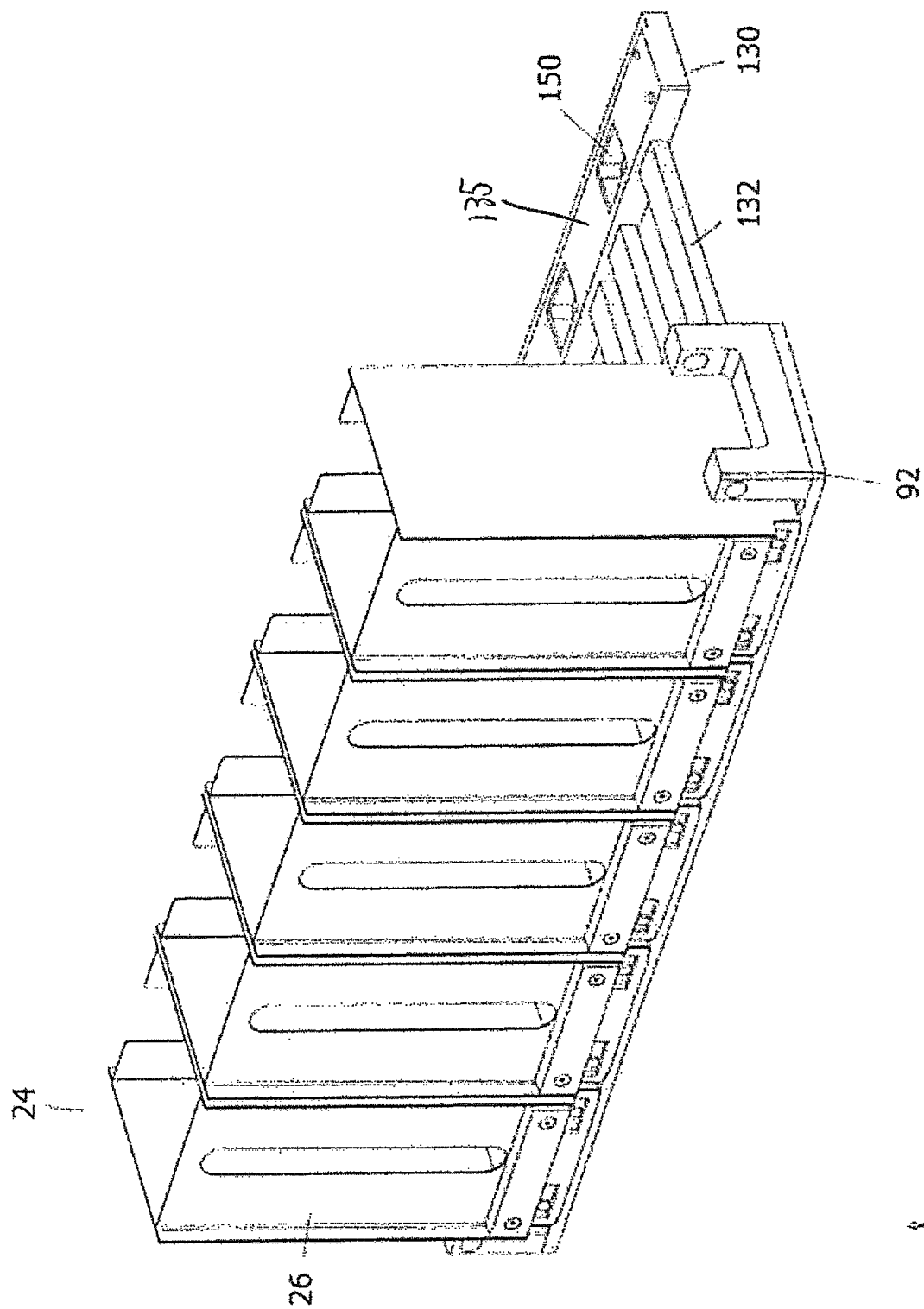
FIG. 13 shows a rear view of an embodiment of the paper interleaver of the present invention.

FIG. 13 shows the paper interleaver 24 having hoppers 26 having mounting brackets 92 at each end of the hoppers 26. The figure shows the finger mounting bracket 130 having lightning holes 150. The fingers 132 are shown in the retracted position. The lightning holes 150 lessen the weight of the finger mounting bracket 130 so that the servo drive motor can move the finger mounting bracket 130 faster due to less weight. In the design shown in FIG. 13, all the fingers move together at the same time. In an alternate design, the fingers are not connected to a finger mounting bracket and can be separately moved, with potentially separate motors.

Figure 14:
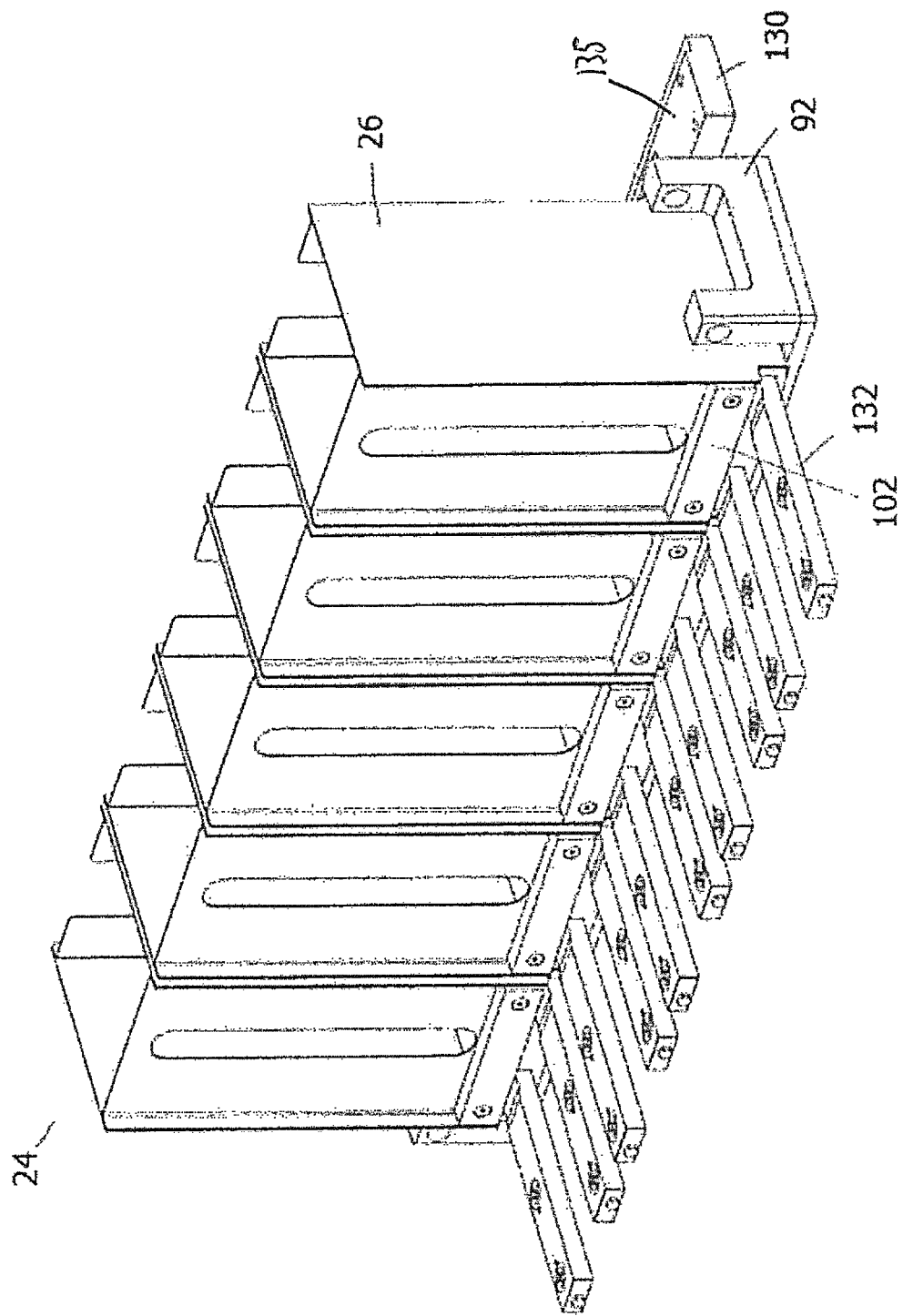
FIG. 14 shows a front view of an embodiment of the paper interleaver of the present invention.

FIG. 14 shows the paper interleaver 24 having hoppers 26 within mounting brackets 92 at each end of the hoppers 26. The figure also shows the fingers 132 in the extended position. In an embodiment, each hopper 26 has two fingers 132 with it. The hopper 26 has bumper 102 in located in the front. The paper interleaver 24 has finger mounting bracket 130. The finger mounting bracket 130 and the fingers 132 move out and back from below the hopper 26. In an embodiment of the invention the fingers are made of aluminum.

Figure 15:
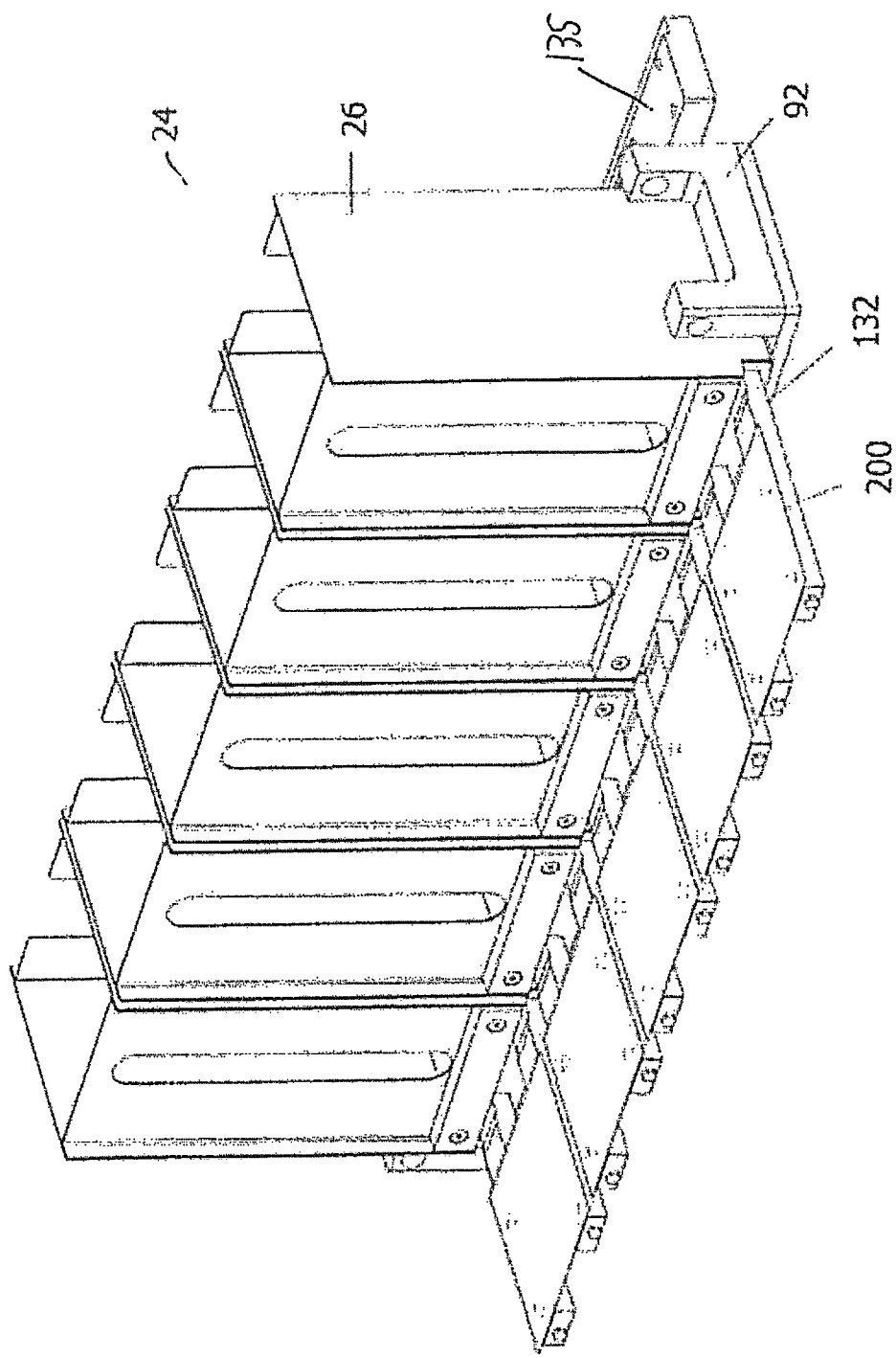
FIG. 15 shows a front view of an embodiment of the paper interleaver of the present invention.

FIG. 15 shows the paper interleaver 24 having hoppers 26 mounted within mounting brackets 92 located at each end of the hoppers 26. The figure also shows the fingers 132 in the extended position. Each hopper has two fingers 132 with it having the paper 200 which has been released by the hopper 26, and held on the fingers by vacuum coming from the openings 138.

Figure 16:
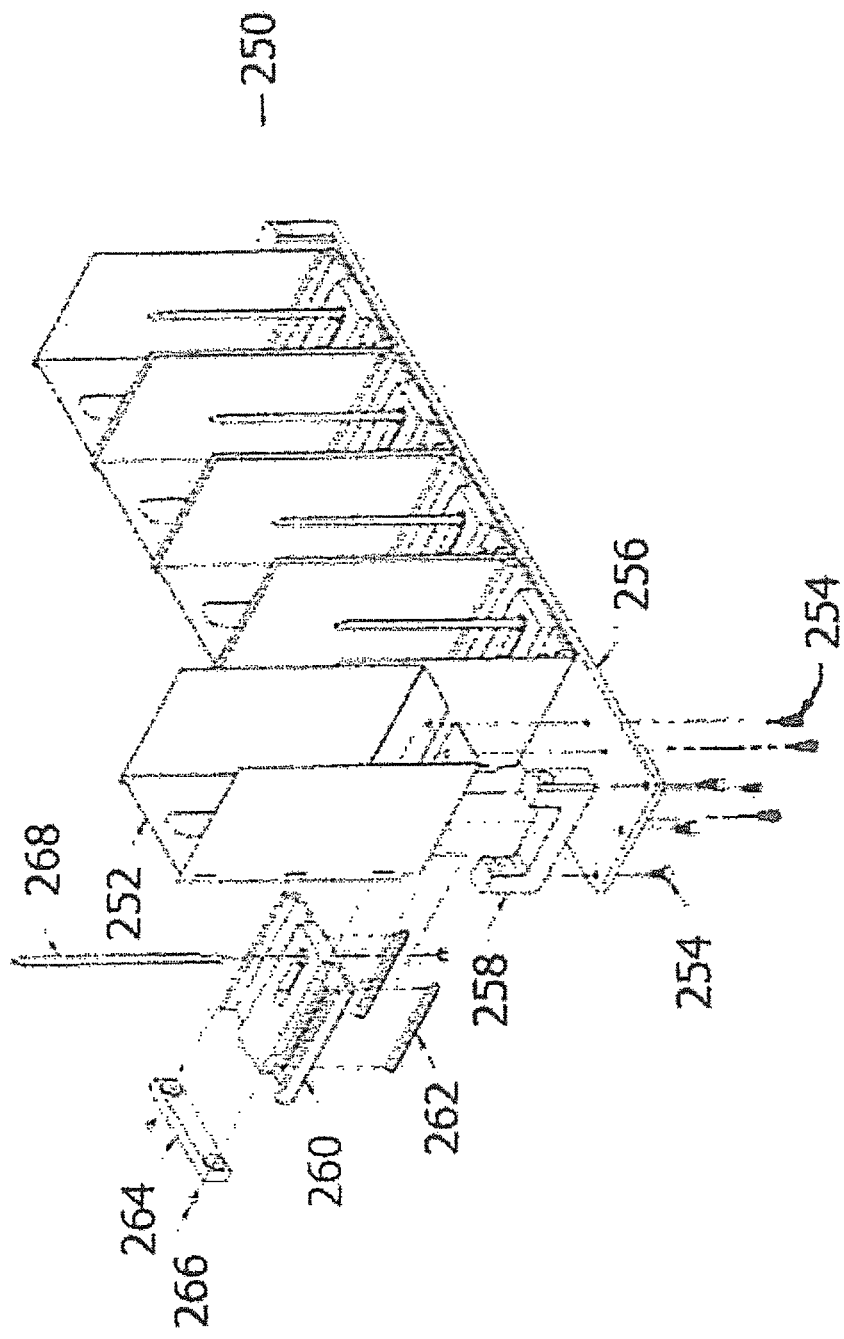
FIG. 16 shows a rear view of an embodiment of the paper interleaver of the present invention.

FIG. 16 shows an embodiment of a paper hopper assembly 250 having hoppers 252 connected by fastening devices 254 to a support plate 256. At the ends of the hopper assembly 252 is mounting brackets 258. At the bottom of each hopper 250 is a guide plate 260. The guide plate 260 rests on wear guides 262. In front of the guide plate 260 and hopper 252 is located a patty bumper 264 and cap screw 266. Pin 268 holds the paper in the hopper 252 until a single piece of paper is released.

The invention claimed is:

1. A method for placing a sheet of paper under a cubed meat patty comprising: forming a patty by a patty forming machine;
   dropping said patty via knock out cups that push said patty out of a mold plate on to a conveyor;
   moving said patty away from said forming machine;
   conveying said patty to move between a series of blades top and bottom of a cuber;
   cubing or perforating top and bottom of said meat patty;
   conveying said top and bottom cubed patty to an interleaver infeed belt;
   triggering an activation switch by movement of said cubed patty on said infeed belt which starts paper assembly process, including use of vacuum to hold said paper until vacuum is turned off so paper is moved into position so cubed patty is conveyed onto paper;
   moving said cubed patty and paper onto exit conveyor.

2. The method of claim 1 wherein velocity of an infeed belt is same or greater than velocity of a cuber belt.

3. The method of claim 1 wherein vacuum holds said paper onto bars with ports with an elastomer seal between said paper and said bars.

4. The method of claim 1 further comprising rolling out a homestyle patty, and then centering it on said paper.

5. The method of claim 1 wherein said forming machine comprises a double row mold plate.

6. The method of claim 1 wherein said forming machine comprises a rotary former.

7. A method for placing a sheet of paper under a meat patty comprising:
   forming a patty by a patty forming machine;
   dropping said patty via knock out cups that push said patty out of a mold plate on to a conveyor;
   moving said patty that is formed away from said forming machine;
   conveying said formed patties to an interleaver infeed belt;
   triggering an activation switch by movement of said formed patties on conveyor belt which starts paper assembly process, including use of vacuum to hold said paper until vacuum is turned off so said paper is moved into position so said formed patty is conveyed onto said paper;
   moving said patty and said paper onto exit conveyor.

8. The method of claim 7 wherein said forming machine comprises a double row mold plate.

9. The system of claim 1 wherein said food patty molding machine comprises a continuously generated rotary former.

* * * * *